United States Patent
Ito et al.

(10) Patent No.: US 9,488,501 B2
(45) Date of Patent: Nov. 8, 2016

(54) MEASURING APPARATUS, MEASURING METHOD, AND PROCESSING APPARATUS THEREOF THAT OBTAIN DISPLACEMENT AMOUNT OF AN OBJECT USING CLOCK IN SYNCHRONIZATION WITH DATA REQUEST SIGNAL

(71) Applicant: CANON KABUSHIKI KAISHA, Tokyo (JP)

(72) Inventors: Takafumi Ito, Utsunomiya (JP); Yoshiyuki Okada, Sakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 14/299,581

(22) Filed: Jun. 9, 2014

(65) Prior Publication Data
US 2014/0367561 A1    Dec. 18, 2014

(30) Foreign Application Priority Data
Jun. 12, 2013    (JP) .................................. 2013-123379

(51) Int. Cl.
*G01D 5/347*    (2006.01)
*G01D 5/244*    (2006.01)

(52) U.S. Cl.
CPC .......... *G01D 5/347* (2013.01); *G01D 5/24471* (2013.01)

(58) Field of Classification Search
CPC ........................ G01D 5/24471; G01D 5/347
See application file for complete search history.

(56) References Cited

U.S. PATENT DOCUMENTS

| | | | |
|---|---|---|---|
| 5,721,546 | A | 2/1998 | Tsutsumishita |
| 2004/0006443 | A1 | 1/2004 | Huber-Lenk et al. |
| 2004/0189496 | A1 | 9/2004 | Hagl |
| 2012/0116715 | A1 | 5/2012 | Yoshitake et al. |
| 2012/0166123 | A1* | 6/2012 | Hino ........................ G01R 27/28 702/89 |

FOREIGN PATENT DOCUMENTS

| | | |
|---|---|---|
| JP | 8-261794 A | 10/1996 |
| JP | 2007-071865 A | 3/2007 |

OTHER PUBLICATIONS

Extended European Search Report issued in corresponding European Patent Application No. 14171884.1, dated Nov. 19, 2014.

* cited by examiner

*Primary Examiner* — Francis M Legasse, Jr.
(74) *Attorney, Agent, or Firm* — Rossi, Kimms & McDowell LLP

(57) ABSTRACT

A measuring apparatus/method detects a signal varying with displacement of an object and measurement of the displacement. The apparatus includes clock generator, detector, operation device, and correction device. The clock generator generates, in synchronization with a request signal for requesting measurement data, a first clock signal having a cycle shorter than a cycle of the request signal. The detector performs the detection with respect to each cycle of the first clock signal. The operation device obtains the measurement data based on output of the detector. The correction device obtains a displacement amount of the object per unit time based on plural measurement data, and corrects the measurement data based on the obtained displacement amount and a time difference between the first clock signal relating to the measurement data and the first clock signal relating to the request signal. The method includes the corresponding steps of the apparatus.

9 Claims, 12 Drawing Sheets

MEASURING APPARATUS, MEASURING METHOD, AND PROCESSING APPARATUS THEREOF THAT OBTAIN DISPLACEMENT AMOUNT OF AN OBJECT USING CLOCK IN SYNCHRONIZATION WITH DATA REQUEST SIGNAL

BACKGROUND OF THE INVENTION

1. Field of the Invention

The present invention relates to a measuring apparatus, a measuring method, and a processing apparatus.

2. Description of the Related Art

Conventionally, an incremental encoder and an absolute encoder each having a different output format are present as measuring apparatuses for measuring positions and angles. Examples of a linear encoder for position measurement include an incremental linear encoder for measuring a relative position (change in position or displacement) and an absolute linear encoder for measuring an absolute position. Furthermore, examples of a rotary encoder for angle measurement include an incremental rotary encoder for measuring a relative angle (change in angle or displacement) and an absolute rotary encoder for measuring an absolute angle. In addition, an optical encoder and a magnetic encoder each having a different operation principle are present. Of these, in an optical encoder, a scale is irradiated with light emitted from a light source, and light transmitted through the scale or light reflected therefrom is received by a photoelectric conversion element. The light source and the photoelectric conversion element are mounted on an object to be moved or rotated and the scale is mounted on a fixing side serving as a reference or vice versa. In an incremental encoder, evenly spaced transmission films or reflection films are machined on a scale and received light intensity is a sine wave having a constant cycle. A signal processing device counts the wave number of the detected sine wave signals. The phase in a cycle is finely divided so as to improve measurement resolution and accuracy. On the other hand, in an absolute encoder, a transmission film or a reflection film having the pseudorandom code is machined on a scale so as to detect received light intensity associated with the pseudorandom code. The signal processing device calculates an absolute position or an absolute angle for the pseudorandom code using a reference table. The phase of the pseudorandom code is finely divided so as to improve measurement resolution and accuracy.

In general, measurement data for positions or angles obtained by these encoders are transmitted to a host system depending on a data request signal from an external host system. For example, the host system is an industrial apparatus using an encoder and executes positioning control of the object based on measurement data obtained from the encoder. Here, in such an encoder, a measurement error caused by a measurement delay time, i.e., a measurement error caused by the product of a moving speed and a delay time may occur when the object is moving. As a technique for correcting such a measurement error, Japanese Patent Laid-Open No. H8-261794 discloses an encoder that estimates the amount of movement of an object in a delay time required for outputting position data using previously-sampled position data so as to correct currently-sampled position data. Also, Japanese Patent Laid-Open No. 2007-71865 discloses an encoder output interpolation method that measures a time from A/D conversion sampling to data request in response to a data request made from the outside and then interpolates position data before and after the data request so as to output position data.

In recent years, there has been increasing the moving speed or rotational speed of the object although highly-accurate position or angle measurement is required for industrial apparatuses or the like. In association with this, a measurement error caused by the measurement delay time of an encoder has been increasing, resulting in a difficulty in highly-accurate measurement. Here, the encoder disclosed in Japanese Patent Laid-Open No. H8-261794 performs signal processing by starting measurement in response to a data request signal from the host system and then outputs position data by correcting an error due to a delay time. However, when the object is in an acceleration motion, an error between speed information for use in correcting a positional error and the actual speed of the object increases, resulting in a difficulty in outputting an accurate position or angle. On the other hand, the encoder disclosed in Japanese Patent Laid-Open No. 2007-71865 requires position data before and after the data request. However, if a time interval for outputting position data is coarse, interpolation accuracy of position data may deteriorate, resulting in a difficulty in outputting an accurate position or angle. In contrast, if the cycle of a data request signal output from the host system is shortened, the amount of output data from the encoder increases, resulting in an increase in a computation load on the host system. Consequently, the host system is complicated and expensive.

SUMMARY OF THE INVENTION

The present invention provides, for example, a measuring apparatus advantageous in terms of precision with which displacement of an object is measured.

According to an aspect of the present invention, a measuring apparatus for performing detection of a signal which varies with displacement of an object and measurement of the displacement is provided that includes a clock generator configured to generate, in synchronization with a request signal for requesting measurement data, a first clock signal having a cycle shorter than a cycle of the request signal; a detector configured to perform the detection with respect to each cycle of the first clock signal; an operation device configured to obtain the measurement data based on an output of the detector; and a correction device configured to obtain a displacement amount of the object per unit time based on a plurality of the measurement data from the operation device, and to correct the measurement data based on the obtained displacement amount and a time difference between the first clock signal relating to the measurement data and the first clock signal relating to the request signal.

Further features of the present invention will become apparent from the following description of exemplary embodiments with reference to the attached drawings.

DESCRIPTION OF THE EMBODIMENTS

Hereinafter, preferred embodiments of the present invention will be described with reference to the drawings.

First Embodiment

Firstly, a description will be given of a measuring apparatus according to a first embodiment of the present invention. The measuring apparatus of the present embodiment is so-called an encoder that detects a signal which varies with displacement of an object (object to be measured) so as to measure the displacement thereof. Hereinafter, a description will be given by taking an example of an optical absolute encoder for measuring the change in position or the displacement of an object. Note that the measuring apparatus of the present invention is not limited to an encoder for measuring the change in position or the displacement of an object but may also be applicable to an encoder or an incremental encoder for measuring the change in angle or the displacement of an object.

Figure 1:
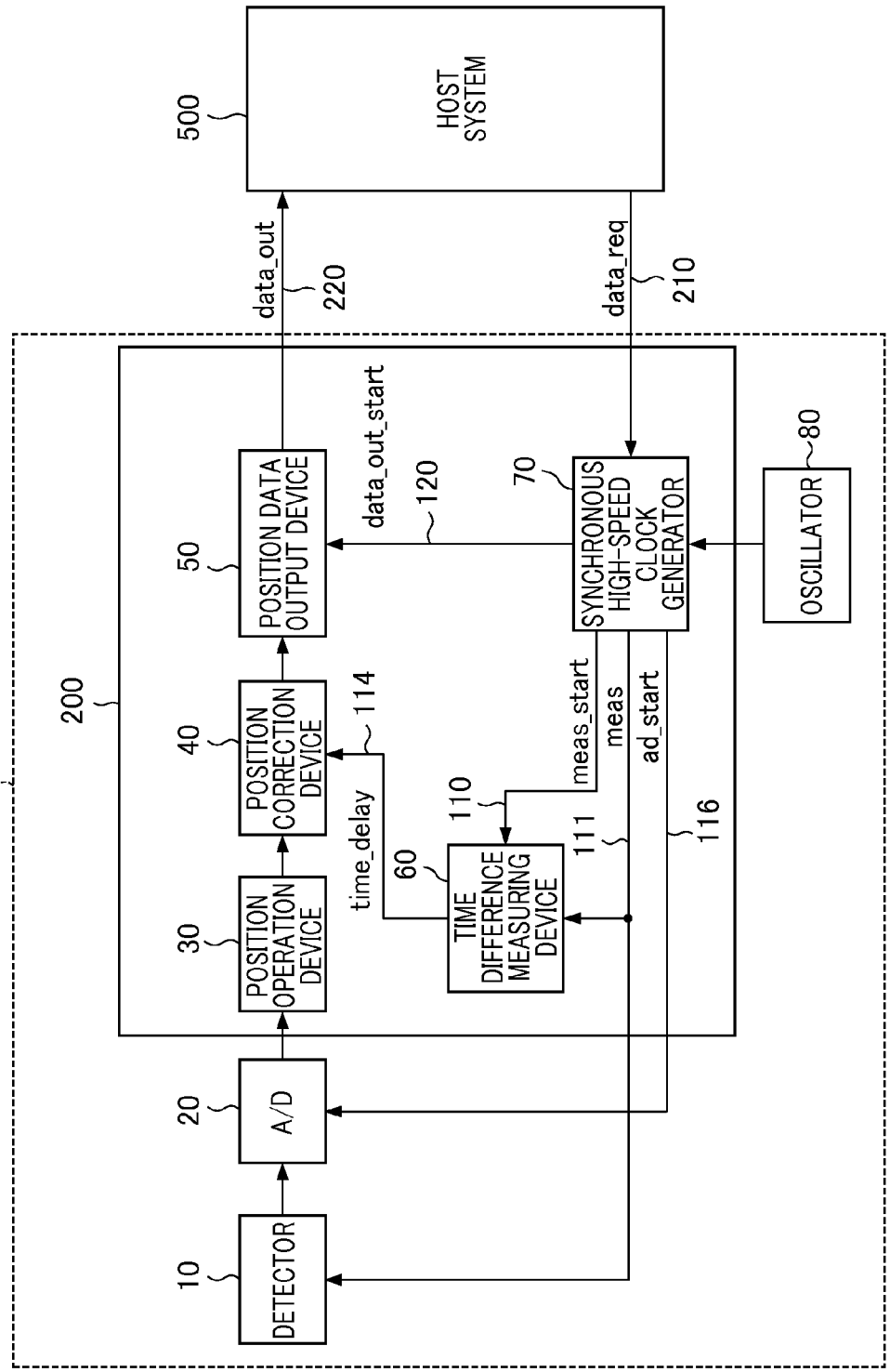
FIG. 1 is a diagram illustrating a configuration of the signal processing system of an encoder according to a first embodiment of the present invention.

FIG. 1 is a block diagram illustrating a configuration of the signal processing system of an encoder 100 according to the present embodiment. Firstly, a description will be given of a host system 500 that transmits a signal (hereinafter referred to as "data request signal") for requesting position data (measurement data) to the encoder 100 and receives position data measured at the timing of a data request. The host system 500 corresponds to a processing apparatus (hereinafter, also used as the meaning of controller) that uses position data obtained from the encoder 100. Here, the term "processing apparatus" specifically refers to a measuring apparatus for measuring the characteristics of an object, an inspecting apparatus for (non-destructive) inspecting an object, a machining apparatus for machining an object, and the like. In other words, the host system 500 may be a data collecting and analyzing unit, which is provided in a measuring apparatus or an inspecting apparatus, for simply collecting/analyzing position data or may also be a controller, which is provided in a machining apparatus, for executing positioning control based on the obtained position data. When the host system 500 is a positioning controller, the control band of positioning control is about several tens to hundreds of Hz. The cycle of a data request is from 1 ms to 100 µs, that is, has a frequency of about 1 kHz to 10 kHz. For example, when positioning control is performed in response to a data request having a frequency of 10 kHz, the host system 500 acquires position data in 100 µs, and then executes control computation such as PID control based on the position data. In general, when an attempt is made to shorten a data request cycle, the host system must perform control computation at a time interval shorter than 100 µs, resulting in an increase in computation load. Consequently, the host system is required to exhibit high performance, resulting in an increase in cost and complication of the host system itself. Thus, in a typical host system, the cycle of a data request is reasonably from 1 ms to 100 µs. The host system 500 operates an actuator based on the result calculated by control computation so as to cause it to perform positioning.

When the host system 500 is a data collecting and analyzing unit, accurate position data at a time point at which the encoder 100 outputs a data request signal is necessary information (to be acquired). In contrast, when the host system 500 is a controller for executing positioning control, positioning control is executed on a clock cycle next or subsequent to a clock cycle in which the encoder 100 outputs a data request signal, accurate position data at a time point of performing positioning control is necessary information. Hereinafter, a description will be firstly given on assumption that the host system 500 collects (acquires) position data, and then, a description will be given of a case where the host system 500 executes positioning control based on the acquired position data.

Figure 2:
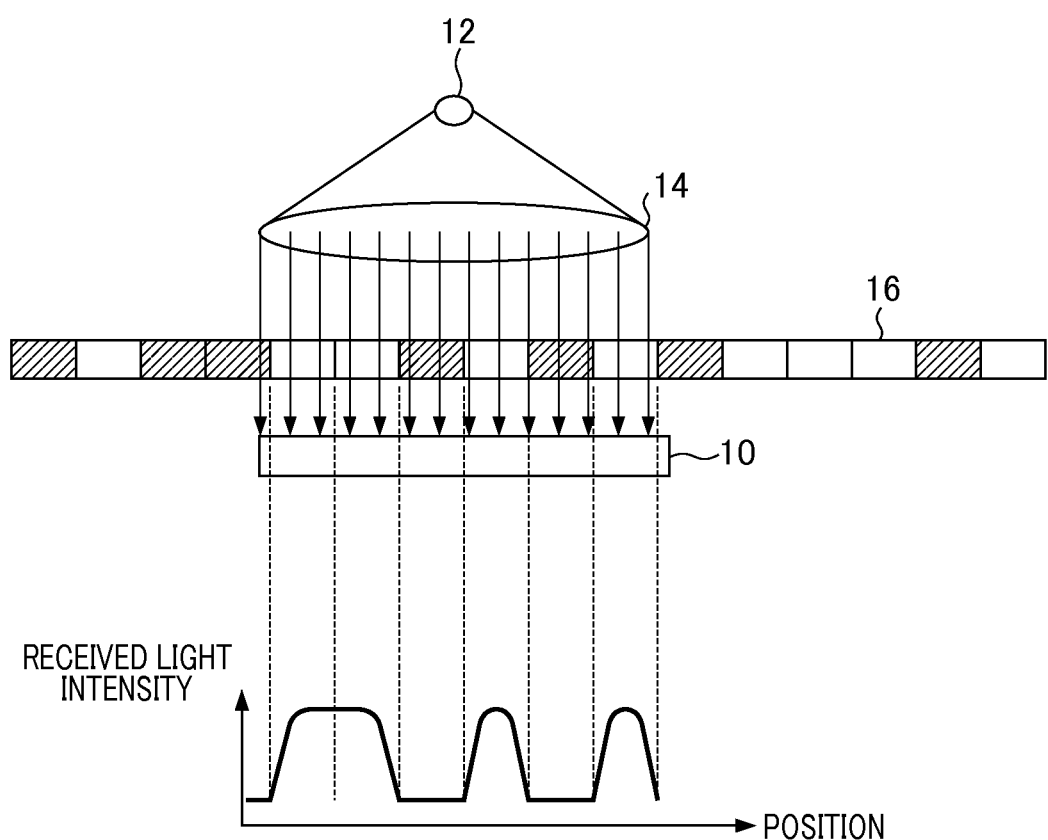
FIG. 2 is a diagram illustrating a configuration of the optical system of the encoder according to the first embodiment.

FIG. 2 is a diagram illustrating a configuration of the optical system of the encoder 100 and the intensity (received light intensity) of light to be detected in association with each other. The encoder 100 includes, for example, a detector 10, a light source 12, a collimator lens 14, and a scale 16. The detector 10 may be a photoelectric conversion element such as a CMOS image sensor, a CCD sensor, or the like but is not limited thereto. The detector 10 may be changed in various ways depending on a measurement method. The light source 12 is, for example, an LED that collimates light into collimated light via the collimator lens 14 and then illuminates the scale 16 with the collimated light. Since the encoder 100 is assumed to be an absolute encoder, the pseudorandom code (e.g., M-series cyclic code) is machined on the scale 16. Note that the scale 16 is a plate member extending in one direction in the case of a linear encoder for measuring a position such as the encoder 100 but may also by a disc-shaped member in the case of a rotary encoder for measuring an angle. Light emitted from the scale 16 by transmission through or reflection from the scale 16 has a received light intensity by the pseudorandom code, and the detector 10 receives the light. As shown in the graph in FIG. 2, the received light intensity is a signal(s) having strengths (amplitudes) reflecting the pseudorandom code formed on the scale 16. The light source 12 and the detector 10 are mounted on an object to be moved (or to be rotated) and the scale 16 is mounted on a fixing side serving as a reference or vice versa.

Referring back to FIG. 1, a current-voltage converter (not shown) is provided downstream of the detector 10 and converts the received light intensity into a voltage signal. Furthermore, a voltage amplifier is provided downstream of the detector 10 as required and amplifies a signal to a predetermined voltage level. An A/D converter 20 A/D-converts a signal from the detector 10 and converts an analog signal into a digital signal.

A signal processing device 200 is a high speed digital signal processor, such as an FPGA, an ASIC, a DSP, or the like for processing a digital signal received from the A/D converter 20, where FPGA is an abbreviation for Field-Programmable Gate Array, ASIC is an abbreviation for Application Specific Integrated Circuit, and DSP is an abbreviation for Digital Signal Processor. The signal processing device 200 includes a position operation device 30, a position correction device 40, a position data output device 50, a time difference measuring device 60, and a synchronous high-speed clock generator 70.

Upon receiving a signal from the A/D converter 20, the position operation device (operation device) 30 calculates position data. For example, in the absolute encoder, the position operation device 30 reproduces the pseudorandom code represented by 0 and 1 using a signal(s) having strengths (amplitudes) reflecting the pseudorandom code as shown in FIG. 2. Then, the position operation device 30 determines the absolute position for the detected pseudorandom code with reference to the reference table of the absolute positions for pseudorandom codes (not shown) stored therein. Furthermore, the position operation device 30 finely divides the phase of the pseudorandom code so as to improve measurement resolution.

The synchronous high-speed clock generator (clock generator) 70 generates a meas signal 111, a meas_start signal 110, an ad_start signal 116, and a data_out_start signal 120. The synchronous high-speed clock generator 70 also generates a clock signal (clk signal 112: see FIG. 3) for use in computation by the position operation device 30 and the position correction device 40.

Figure 3:
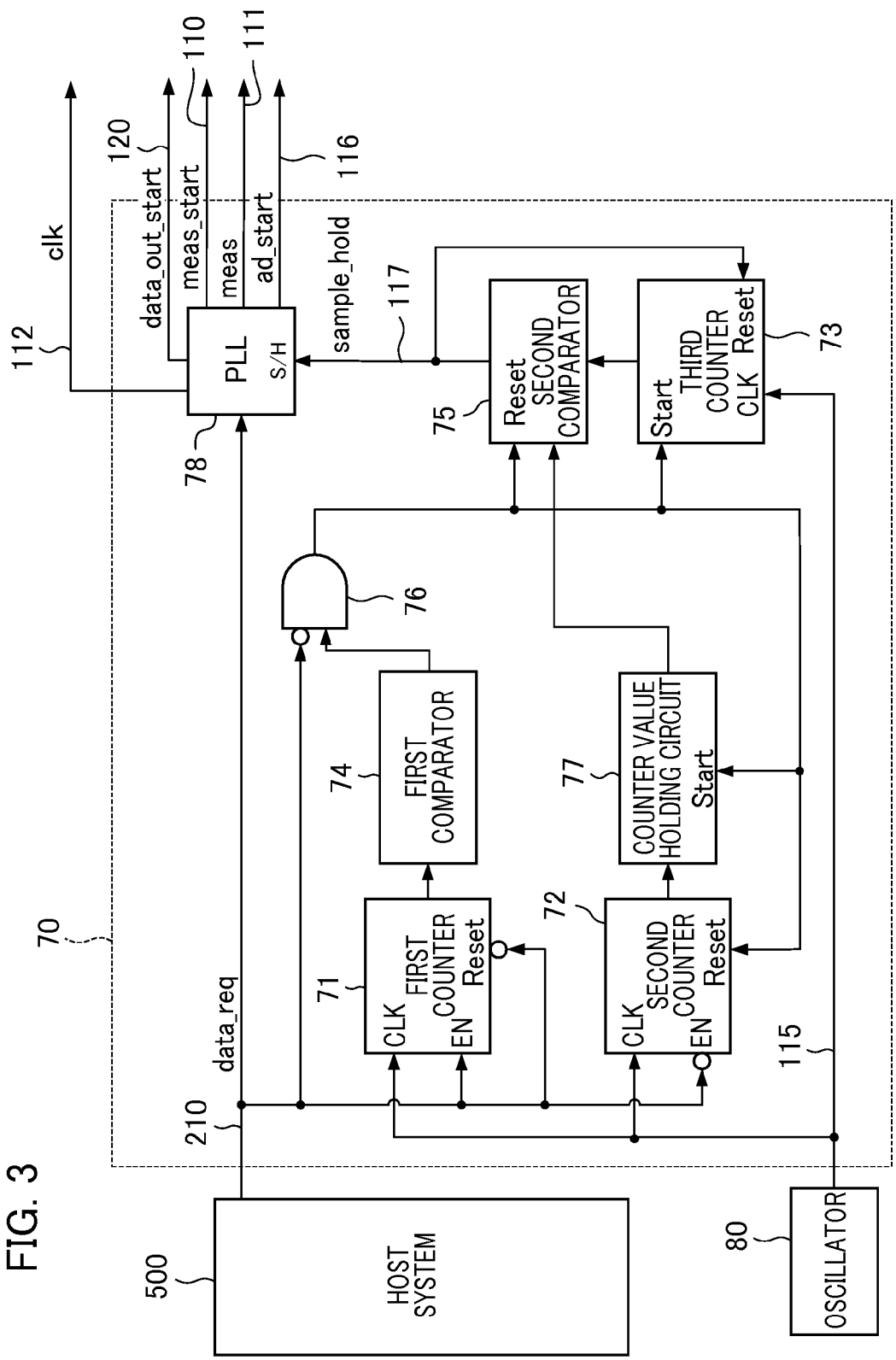
FIG. 3 is a diagram illustrating a configuration of a synchronous high-speed clock generator.

FIG. 3 is a block diagram illustrating a configuration of the synchronous high-speed clock generator 70. The synchronous high-speed clock generator 70 includes three counters (first counter 71, second counter 72, and third counter 73), two comparators (first comparator 74 and second comparator 75), an AND logic circuit (AND circuit) 76, a counter value holding circuit 77, and a phase synchronizing device (PLL) 78. A data_req signal 210 is input as a data request signal from the host system 500 to the synchronous high-speed clock generator 70. The data_req signal 210 is an intermittent signal having one cycle of combining a term (first term) of a clock signal having a predetermined frequency and a term (second term) for which the voltage becomes constant (constant value) for a predetermined time. For example, the data_req signal 210 may be a signal based on the BiSS-C open protocol. Hereinafter, the first term is referred to as a "clock (CLK) term" and the second term is referred to as "timeout (Timeout) term". Furthermore, the data_req signal 210 is divided into signals to be input to the PLL 78, the AND logic circuit 76, the first counter 71, and the second counter 72. Firstly, the synchronous high-speed clock generator 70 generates the meas signal 111 using a phase synchronizing device based on the data_req signal 210. The meas signal 111 is a high speed clock signal (first clock signal) for position measurement in synchronization with the data_req signal 210. The phase synchronizing device is, for example, a PLL (Phase Locked Loop: hereinafter referred to as "PLL 78"). Note that the data_req signal 210 is an intermittent signal including a timeout term. Thus, if an attempt is made to generate a clock signal highly multiplied by a frequency divider by directly inputting the data_req signal 210 to the PLL 78, the data_req signal 210 becomes out of synch in a timeout term, resulting in a reduction in clock accuracy. Thus, in the timeout term, processing for holding the operation of the PLL 78 needs to be executed so as to avoid the influence of the timeout term.

Figure 4:
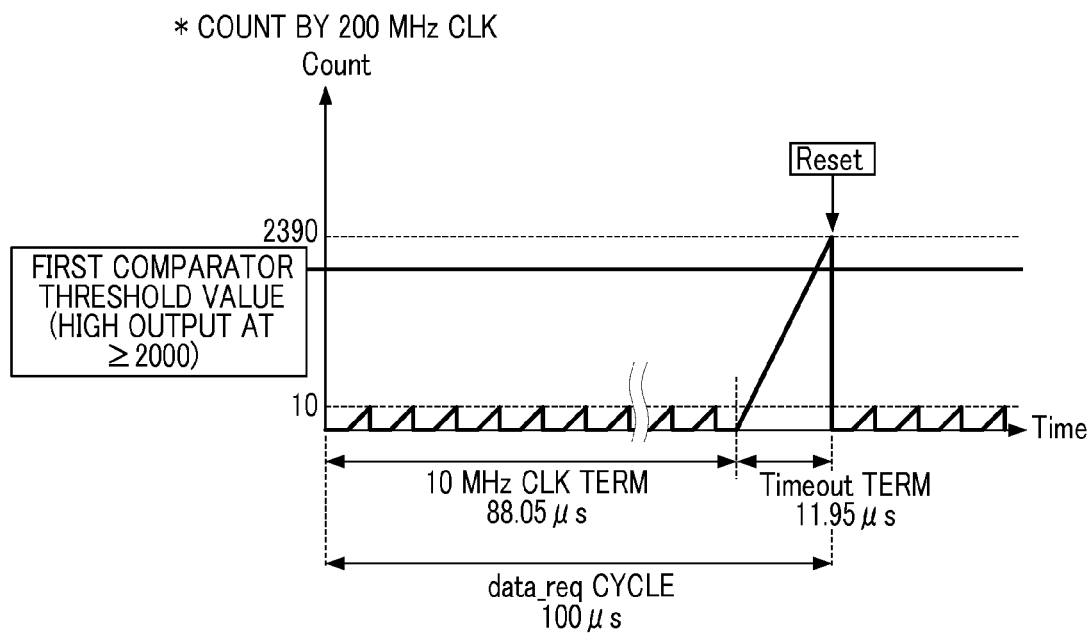
FIG. 4 is a diagram illustrating the operation of the first counter provided in the synchronous high-speed clock generator.

The first counter 71 counts the high term of the data_req signal 210 using a clock signal 115 from an oscillator 80, and is reset when the data_req signal 210 is low. FIG. 4 is a diagram illustrating the operation of the first counter 71, where time is plotted on the horizontal axis and the number of counts is plotted on the vertical axis. Here, the cycle of the data_req signal 210 is 100 µs. The clock term of the data_req signal 210 is 88.05 µs and the frequency of the clock signal in the clock term is 10 MHz. On the other hand, the timeout term of the data_req signal 210 is 11.95 µs. The frequency of the clock signal 115 output from the oscillator 80 is 200 MHz. In this example, the first counter 71 does not perform counting in a low term (50 ns) in the clock term of the data_req signal 210. The data_req signal 210 becomes low at a time point at which the first counter 71 has counted up to 10 counts in a high term (50 ns), and then, the first counter 71 is reset. By repeating this process, the count operation of the first counter 71 has a sawtooth-shaped profile as shown in FIG. 4. For example, when the clock frequency of the data_req signal 210 in the clock term is 0.1 MHz, the count operation of the first counter 71 has a sawtooth-shaped profile at every 1000 counts. Since the data_req signal 210 is high in the timeout term, the first counter 71 continues counting. The time for one cycle of the data_req signal 210 elapses at a time point at which the first counter 71 has counted up to 2390 counts, and then the data_req signal 210 becomes low, so that the first counter 71 is reset.

The first comparator 74 compares the count value of the first counter 71 with a threshold value set in the first comparator 74, and outputs high when the count value is greater than the threshold value. The threshold value set in the first comparator 74 is set to a value such that the count value in the clock term never exceeds the threshold value but only the count value in the timeout term exceeds the threshold value. In the example shown in FIG. 4, the threshold value set in the first comparator 74 is 2000 counts.

The AND logic circuit 76 executes logical "AND" computation between the output of the first comparator 74 and the low of the data_req signal 210. As described above, the first comparator 74 outputs high during the timeout term of the data_req signal 210. After the first comparator 74 outputs high, the data_req signal 210 becomes low at a time point at which the timeout term ends, i.e., at a time point at which the time for one cycle of the data_req signal 210 has elapsed. The AND logic circuit 76 is synchronized with a time point at which the time for one cycle of the data_req signal 210 has elapsed so as to output high. The output of the AND logic circuit 76 is used as a reset signal to the second counter 72, a start signal to the counter value holding circuit 77, and a start signal to the third counter 73, all of which will be described below.

Figure 5:
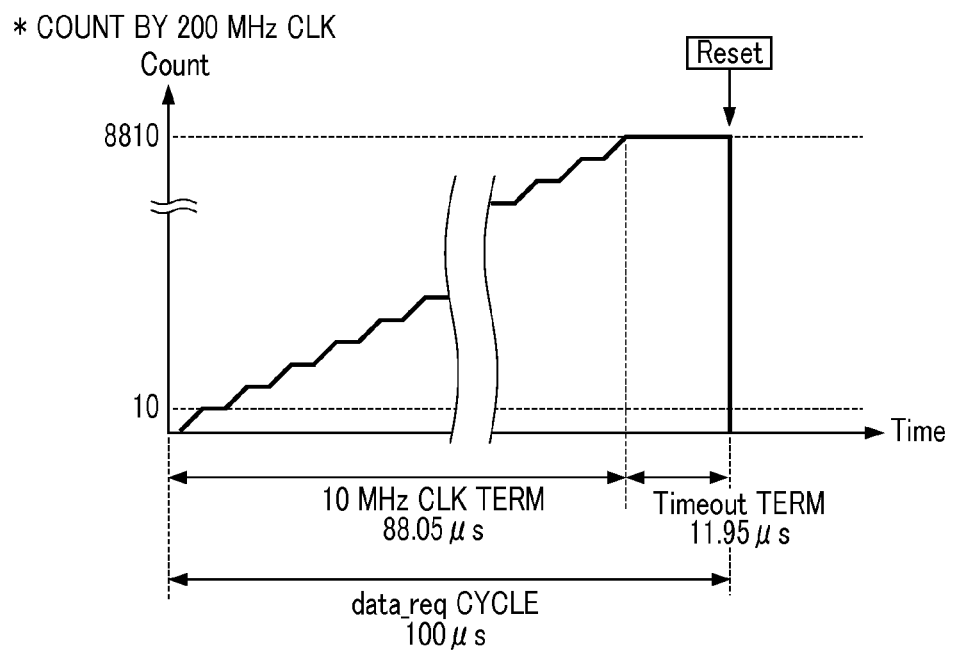
FIG. 5 is a diagram illustrating the operation of the second counter provided in the synchronous high-speed clock generator.

As opposed to the first counter 71, the second counter 72 counts the low term of the data_req signal 210 using the clock signal 115 from the oscillator 80. The second counter 72 is reset based on the output of the AND logic circuit 76. FIG. 5 is a diagram illustrating the operation of the second counter 72, where time is plotted on the horizontal axis and the number of counts is plotted on the vertical axis. Note that the conditions for the data_req signal 210 and the clock signal 115 from the oscillator 80 are the same as those as set forth in the description of the operation of the first counter 71. In this example, the second counter 72 counts up to 10 counts in a low term (50 ns) in the clock term of the data_req signal 210, and then holds the count value without further counting in the high term (50 ns). The second counter 72 further counts up to 20 counts which is incremented by 10 counts in the next low term (50 ns). By repeating this process, the count operation of the second counter 72 has a stepwise profile as shown in FIG. 5. For example, when the clock frequency of the data_req signal 210 in the clock term is 0.1 MHz, the count operation of the second counter 72 has a stepwise profile at every 1000 counts. Since the data_req signal 210 is high in the timeout term, the second counter 72 continues to hold the count value without further counting. Then, the count value is set as the final count value. Under the above conditions, the final count value is 8810 counts. Then, the second counter 72 is reset at a time point at which the AND logic circuit 76 outputs high, i.e., at a time point at which the time for one cycle of the data_req signal 210 has elapsed.

The counter value holding circuit 77 holds the final count value, for example, a count value at a time point at which the output of the AND logic circuit 76 is set as a start signal. The output of the second counter 72 may be input in a delayed manner such that the counter value holding circuit 77 does not hold a count value obtained after the second counter 72 is reset. Although the configuration is different from that shown in FIG. 3, the counter value holding circuit 77 may also be adapted to hold a count value using the output of the first comparator 74 as a start signal. Thus obtained final count value is a value indicating the length of the clock term of the data_req signal 210. The final count value is used as a threshold value for the second comparator 75 to be described below.

The third counter 73 starts counting from a time point at which the time for one cycle of the data_req signal 210 has elapsed, i.e., a time point at which a data request has been made after the output of the AND logic circuit 76 was input as a start signal for the counting. The clock signal 115 from the oscillator 80 is input as a clock serving as a reference for counting to the third counter 73 as in the first counter 71 and the second counter 72.

The second comparator 75 compares the count value of the third counter 73 with a threshold value set in the second comparator 75. The threshold value set in the second comparator 75 is set to the final count value output from the counter value holding circuit 77. The second comparator 75 outputs low in a term during which the count value of the third counter 73 does not exceed the threshold value set in the second comparator 75, i.e., in the clock term of the data_req signal 210. Then, the second comparator 75 outputs high in a term during which the count value of the third counter 73 exceeds the threshold value set in the second comparator 75, i.e., in the timeout term of the data_req signal 210. The third counter 73 is reset at a time point at which the second comparator 75 outputs high. Then, the third counter 73 stops counting until a start signal is input again, i.e., until the time for one cycle of the data_req signal 210 elapses. It should be noted that the second comparator 75 continuously outputs high until the second comparator 75 is reset by receiving the output of the AND logic circuit 76, i.e., until the time for one cycle of the data_req signal 210 elapses. The output of the second comparator 75 is used by the PLL 78 as a control signal for switching a sample operation and a hold operation. Hereinafter, the output of the second comparator 75 is referred to as a sample_hold signal 117.

Figure 6:
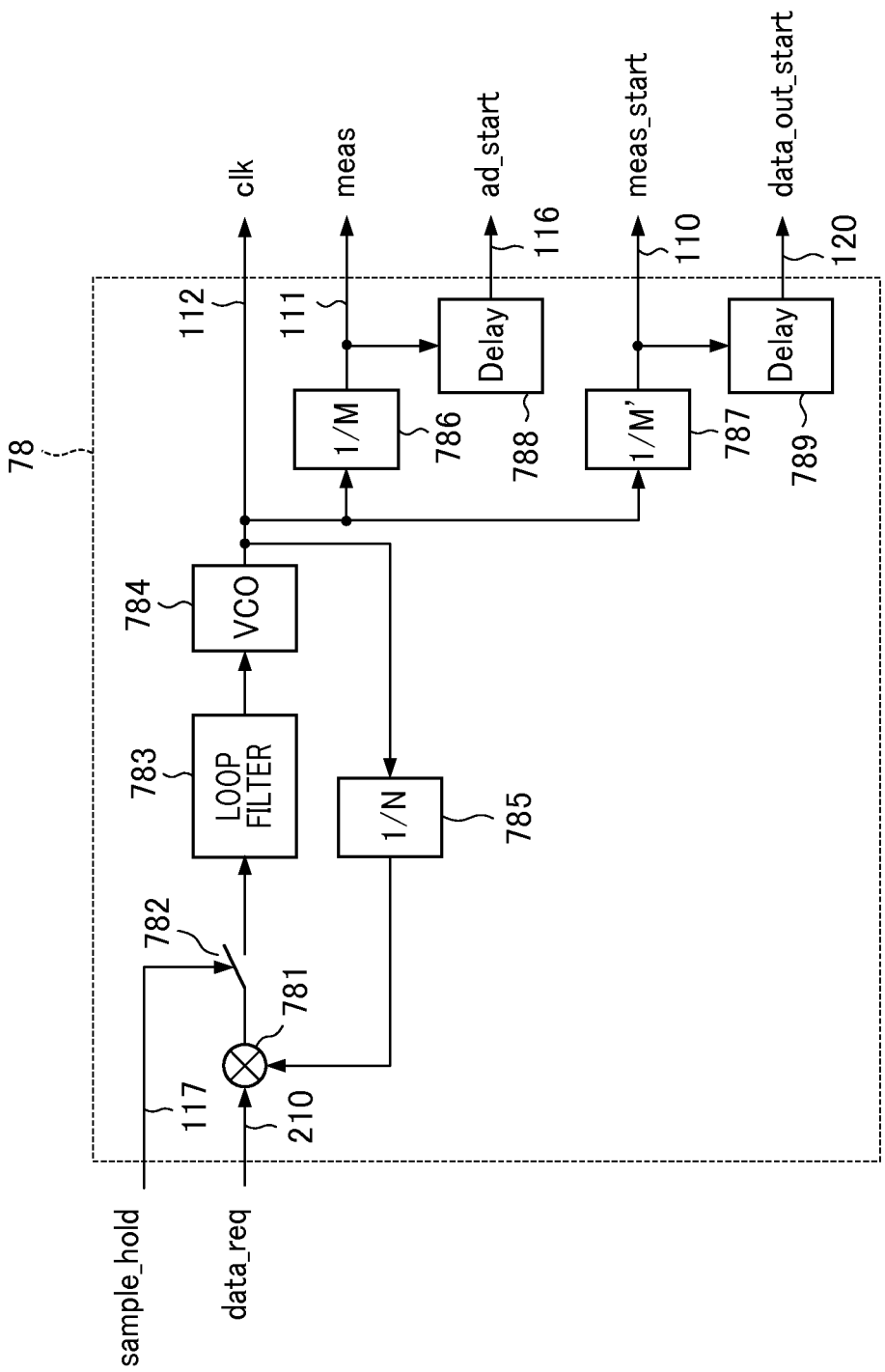
FIG. 6 is a diagram illustrating a configuration of a PLL provided in the synchronous high-speed clock generator.

The PLL 78 performs a sample operation in a term during which the sample_hold signal 117 is low, i.e., in the clock term of the data_req signal 210. On the other hand, the PLL 78 performs a hold operation in a term during which the sample_hold signal 117 is high, i.e., in the timeout term of the data_req signal 210. FIG. 6 is a block diagram illustrating a configuration of the PLL 78. The PLL 78 includes a phase comparator 781, a sample and hold switch 782, a loop filter 783, a voltage control oscillator 784, a first frequency divider 785, a second frequency divider 786, a third frequency divider 787, a first delay circuit 788, and a second delay circuit 789.

The phase comparator 781 constitutes a feedback loop so as to compare an input signal (the data_req signal 210) with an output signal (a clk signal 112). Then, the phase comparator 781 performs phase comparison between an input signal and an output signal and then outputs the phase difference as a phase difference signal. The loop filter 783 is an integrating circuit for removing short cycle fluctuations. The voltage control oscillator (VCO) 784 adjusts an oscillation frequency based on a phase difference signal input from the loop filter 783 so as to output the clk signal 112. The clk signal 112 is a clock signal for use in computation by the position operation device 30 and the position correction device 40 as described above.

Firstly, the sample and hold switch 782 is turned ON in the clock term of the data_req signal 210, i.e., in a term during which the sample_hold signal 117 is low, so that the feedback loop is configured for the phase comparator 781. At this time, the PLL 78 performs a sample operation. The output signal to be fed back is frequency-divided by the first frequency divider 785, and then is input to the phase comparator 781 so as to compare it with the clock signal of the data_req signal 210. Then, the voltage control oscillator 784 outputs a signal multiplied by the clock frequency of the data_req signal 210. For example, when the clock frequency is 10 MHz and the frequency division ratio (1/N) of the first frequency divider 785 is ½₀, the voltage control oscillator 784 outputs a signal having a frequency of 200 MHz in synchronization with a clock signal. In this manner, the PLL 78 can output a high-frequency second clock signal (the clk signal 112) in synchronization with the clock signal of the data_req signal 210.

On the other hand, the sample and hold switch 782 is turned OFF in the timeout term of the data_req signal 210, i.e., in a term during which the sample_hold signal 117 is high, so that the feedback loop is not configured for the phase comparator 781. At this time, the PLL 78 performs a hold operation. In this case, since no new phase difference signal is input to the voltage control oscillator 784, the voltage control oscillator 784 continuously outputs a signal having an oscillation frequency adjusted in the clock term of the data_req signal 210. Thus, the PLL 78 can output a second clock signal (the clk signal 112) in synchronization with the clock signal of the data_req signal 210 without being affected by a fixed voltage for a predetermined time in the timeout term.

Note that the clk signal 112 is not limited to the one generated by the PLL 78 but may also be generated by an external clock such as the oscillator 80 or the like. In this case, the clk signal 112 is asynchronous with the data_req signal 210 and there is sync deviation of 5 ns between the clk signal 112 and the data_req signal 210 for one cycle at the maximum when the frequency of the clk signal 112 is 200

MHz. However, a measurement error caused by sync deviation is very small, so that the influence of sync deviation can be ignored.

Also, the PLL 78 causes the second frequency divider 786 to frequency-divide the clk signal 112 so as to generate the meas signal 111 which is a high speed clock signal for position measurement in synchronization with the data_req signal 210. For example, when the frequency division ratio (1/M) of the second frequency divider 786 is ½₀₀₀, the meas signal 111 is a signal having a frequency of 100 kHz in synchronization with the data_req signal 210. Also, the PLL 78 causes the first delay circuit 788 to delay the meas signal 111 by the time from the start of position measurement to the end of position measurement by the detector 10 so as to generate the ad_start signal 116 which is a start signal for A/D conversion by the A/D converter 20. The PLL 78 causes the third frequency divider 787 to frequency-divide the clk signal 112 so as to generate the meas_start signal 110 which a signal in synchronization with the data_req signal 210 and having the same frequency as that of the data_req signal 210. For example, when the frequency division ratio (1/m') of the third frequency divider 787 is ½₀₀₀₀, the meas_start signal 110 is a signal having a frequency of 10 kHz in synchronization with the data_req signal 210. Furthermore, the PLL 78 causes the second delay circuit 789 to delay the meas_start signal 110 by a predetermined time so as to generate the data_out_start signal 120 which is a start signal for outputting data from the position data output device 50 shown in FIG. 1.

Note that the PLL generally requires a predetermined time until the phase is locked to the input. Thus, the PLL 78 is configured to return an error signal to a data request until the stable operation is obtained with phase locked loop. The output of the phase comparator 781 is monitored so as to check whether or not the PLL 78 is in stable operation with phase locked loop. For example, when the output of the phase comparator 781 is substantially zero, it is found that the PLL 78 is in stable operation with phase locked loop.

Referring back to the description in FIG. 1, the detector 10 performs position measurement with respect to each cycle of the meas signal 111 received from the synchronous high-speed clock generator 70. Also, the A/D converter 20 starts A/D conversion using the ad_start signal 116 received from the synchronous high-speed clock generator 70.

The time difference measuring device 60 measures a correction delay time (Tsp) for correcting position data based on the meas_start signal 110 and the meas signal 111 received from the synchronous high-speed clock generator 70 so as to output the correction delay time (Tsp) as a time_delay signal 114. When the correction delay time is determined in advance from the design value of the encoder 100, the correction delay time is directly used so that there is no need to constitute the time difference measuring device 60.

The position correction device (correction device) 40 calculates a speed-related signal from the amount of change (the displacement amount) in at least two position data per unit time (with respect to each cycle of the meas signal 111) using the time_delay signal 114. Then, the position correction device 40 corrects position data which has been calculated by the position operation device 30 using the product of the calculated signal and the correction delay time. Here, the corrected correction position data is temporarily stored in the position data output device 50, is synchronized with the data_out_start signal 120 received from the synchronous high-speed clock generator 70, and then is output as a data_out signal 220 to the host system 500.

Figure 7:
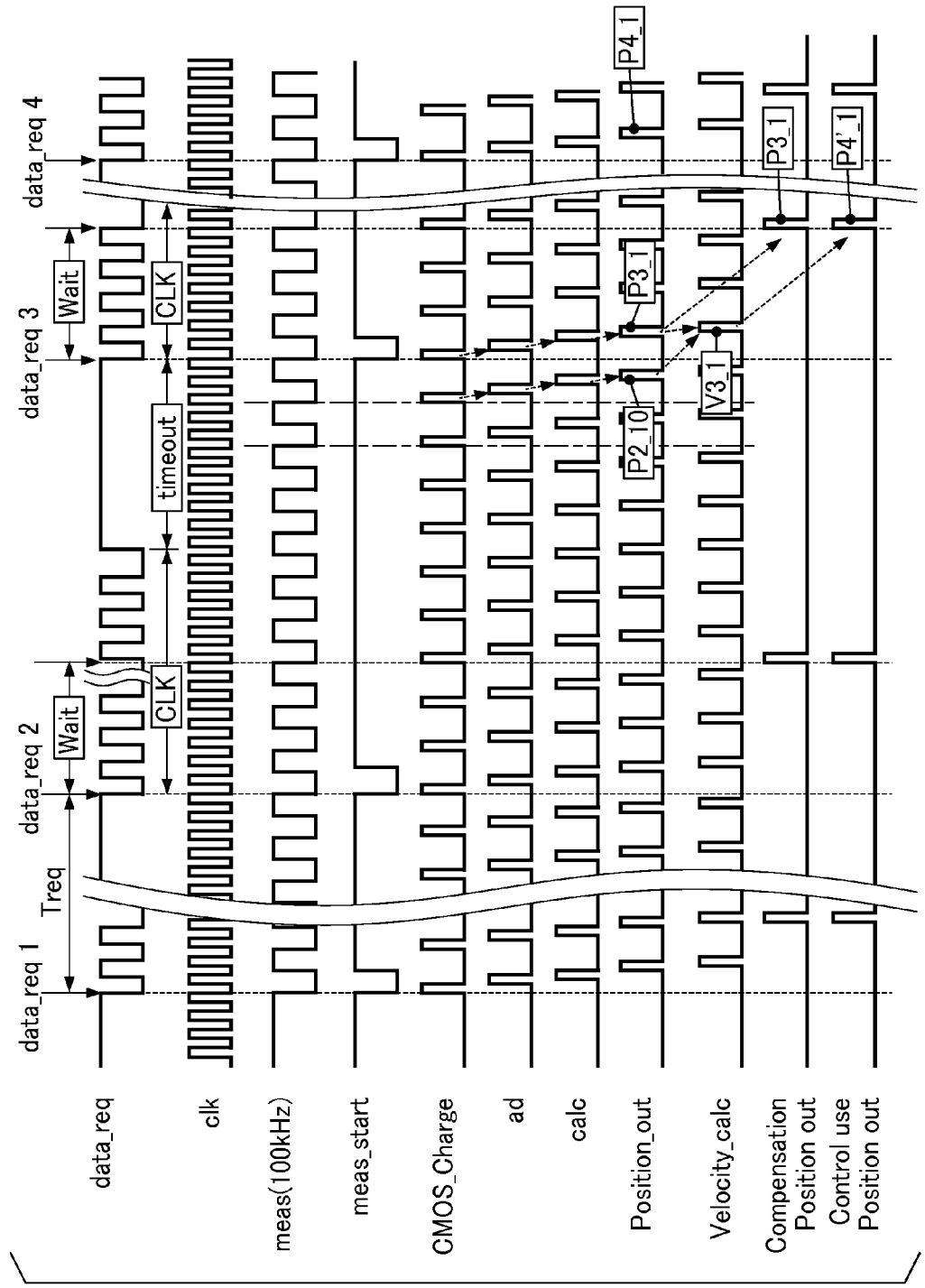
FIG. 7 is a timing chart illustrating the operation timing of the respective units according to the first embodiment.

Next, a description will be given of the operation timing and signal processing performed by the respective units of the encoder 100. FIG. 7 is a timing chart illustrating the operation timing of the respective units. Firstly, the term "data_req" refers to the data_req signal 210. Here, with respect to the notation of "data_req", the data request cycle "Treq" (time interval among the data_req 1, the data_req 2, and the data_req 3) is assumed to be 100 µs. The range "CLK" represented by the two-way arrow indicates the clock term of the data_req signal 210. The range "Timeout" represented by the two-way arrow indicates the timeout term of the data_req signal 210. The range "Wait" represented by the two-way arrow indicates a wait time (hereinafter referred to as "Wait time") from a time point at which a data request has been made to a time point at which measurement data is actually output. These values are determined by the communication protocol between the host system 500 and the encoder 100. The term "clk" refers to the clk signal 112 having a frequency of 200 MHz. The term "meas (100 kHz)" refers to the meas signal 111 having a frequency of 100 MHz. The term "meas_start" refers to the meas_start signal 110 having a cycle of 100 µs which is the same as the data request cycle "Treq". The term "CMOS_Charge" is a time at which position data is actually acquired by the detector 10, for example, a time at which light is received by a CMOS image sensor. The CMOS_Charge is started by the meas signal 111, and the detector 10 acquires position data with respect to each cycle of the meas signal 111. The term "ad" refers to a time from the start of A/D conversion of the analog data output from the detector 10 by the A/D converter 20 upon receiving the ad_start signal 116 to the end of A/D conversion. The term "calc" refers to a time during which position data is computed by the position operation device 30 based on the digital data output from the A/D converter 20. The term "Position_out" refers to a time at which position data is output from the position operation device 30.

Next, a description will be given of the operation timing and signal processing particularly relating to position correction computation with reference to FIG. 7. Firstly, a description will be given of a case where a processing time from the start of position measurement to the end of computation of correction position data is shorter than the Wait time. For example, consider the case where it may be desired for the host system 500 to obtain position data at the time point of the data_req 3 in FIG. 7 based on the assumption that the processing time from the start of position measurement to the end of computation of correction position data is 10 µs and the Wait time is 30 µs. In this case, the processing up to position data computation ends during the Wait time, and thus, position data P3_1 acquired at the time point of the data_req 3 is output as it is. In other words, the encoder 100 outputs the position data measured at the time point of the data_req 3 without performing correction processing.

On the other hand, a description will be given of a case where the host system 500 is a controller that executes positioning control using the acquired position data. For example, consider the case where position data, which is actually used for control, for a measurement request made at the time point of the data_req 3 is the one at the time point of a data_req 4 which is the next clock timing. In this case, position data subject to correction upon control P4'_1, which predicts position data P4_1 at the time point of the data_req 4, for a measurement request made at the time point of the data_req 3 needs to be output.

Here, a description will be given of a method for calculating position data subject to correction upon control.

Firstly, in FIG. 7, the term "Velocity_calc" refers to a time for computing the moving speed of an object at the time point of acquisition of current position data based on the currently acquired position data and the previously acquired position data. Here, the moving speed is determined by the following Formula (1):

Moving speed [m/s]=(current position data [m]−previous position data [m])/position measurement cycle [s] (1)

For example, when the velocity V3_1 at the time point of the position data P3_1 is determined, Formula (1) is represented as the following Formula (2). Note that the position measurement cycle is 10 μs (from the frequency 100 kHz of the meas signal 111).

V3_1 [m/s]=(P3_1 [m]−P2_10 [m])/10 [μs] (2)

In FIG. 7, the term "control use Position out" refers to a time for computing and outputting position data subject to correction upon control based on the moving speed. The position data subject to correction upon control is determined by the following Formula (3):

Position data subject to correction upon control [m]=current position data [m]+moving speed [m/s]×time difference from a time point of control [s] (3)

For example, the position data subject to correction upon control P4'_1 is determined by the following Formula (4). Note that a time difference from a time point of control is 100 μs.

P4'_1 [m]=P3_1 [m]+V3_1 [m/s]×100 [μs] (4)

Figure 8:
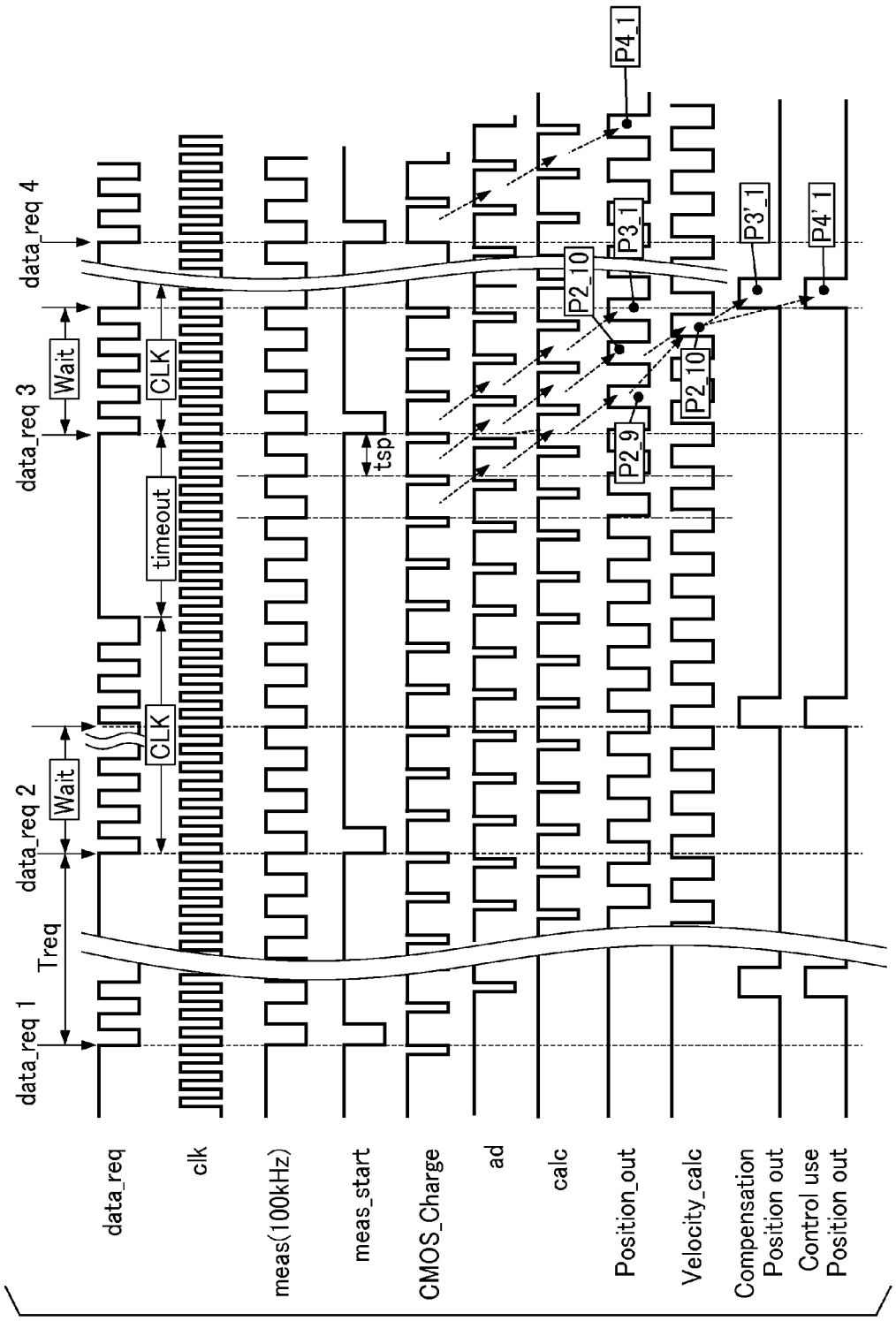
FIG. 8 is a timing chart illustrating the operation timing of the respective units according to the first embodiment.

Next, a description will be given of a case where a processing time from the start of position measurement to the end of computation of correction position data is longer than the Wait time with reference to FIG. 8. Hereinafter, an assumption is made as an example that the processing time from the start of position measurement to the end of computation of correction position data is 30 μs and the Wait time is 30 μs as described above. FIG. 8 is a timing chart in this case corresponding to FIG. 7. Here, consider the case where it may be desired for the host system 500 to obtain position data at the time point of the data_req 3 in FIG. 8. As shown in FIG. 8, the processing up to output of the position data P3_1 at the time point of the data_req 3 does not end during the Wait time in contrast to the case shown in FIG. 7. In other words, the encoder 100 cannot output the position data P3_1 as it is. Thus, in this case, position data subject to correction upon measurement P3'_1, which predicts the position data P3_1 at the time point of the data_req 3, needs to be output.

Formula for determining position data subject to correction upon measurement in this case is similar to the above Formula (3) and is represented by the following Formula (5):

Position data subject to correction upon measurement [m]=current position data [m]+moving speed [m/s]×Tsp [s] (5)

Note that Formula for determining a moving speed is the same as the above Formula (1). As shown in FIG. 8, Tsp is a time difference between a time point at which measurement of current position data is started and a time point at which a data request has been made. In FIG. 1, the term Tsp is input as the time_delay signal 114 from the time difference measuring device 60 to the position correction device 40.

Here, a description will be given of a method for determining Tsp. Firstly, as the initial operation of the encoder 100, the time difference measuring device 60 counts the number of clocks of the meas signal 111 during the data request cycle "Treq". In this manner, the time difference measuring device 60 can recognize how many clocks of the meas signal 111 are included during the data request cycle "Treq". Given that the number of clocks is referred to as "the total number of clocks", the total number of clocks in the example shown in FIG. 8 is 10. Since the meas signal 111 is a signal which is generated by the synchronous high-speed clock generator 70 based on the data_req signal 210, the total number of clocks is apparent from the design value of the synchronous high-speed clock generator 70. Thus, when the total number of clocks is obtained from the design value, there is no need to constitute the time difference measuring device 60 as described above. The position correction device 40 adds information indicating data measured at the nth number of clocks from a time point at which a data request has been made to position data information, where the nth number of clocks is defined as a current clock number. For example, in position data P2_10 shown in FIG. 8, the current clock number is 10. In this manner, the position correction device 40 can recognize the fact that the position data information is an nth clock prior to a time point at which a data request has been made using the following Formula (6). The clock is referred to as "the reference clock number for correction value computation".

Reference clock number for correction value computation=(total number of clocks+1)−current clock number (6)

For example, for the position data P2_10, the reference clock number for correction value computation is 1 as a result of computation: 10+1−10=1. In other words, the position data P2_10 is position data measured at one clock prior to a time point at which a data request has been made. Finally, Tsp is determined by the following Formula (7):

Tsp [s]=Cycle of meas signal [s]×reference clock number for correction value computation (7)

For example, Tsp in FIG. 8 is determined as expressed by the following Formula (8):

Tsp [s]=10 [μs]×1=10 [μs] (8)

Tsp thus determined is substituted into Formula (5), so that position data subject to correction upon measurement can be determined. For example, the position data subject to correction upon measurement P3'_1 at the time point of the data_req 3 is determined by the following Formula (9):

P3'_1 [m]=P2_10 [m]+V2_10 [m/s]×10 [μs] (9)

Then, the position data output device 50 outputs position data subject to correction upon measurement, which is most proximate in time to a time point at which a data request for the data_req 3 has been made among position data subject to correction upon measurement determined in Formula (9), to the host system 500.

While Tsp is a time difference between a time point at which the detector 10 starts measurement and a time point at which a data request has been made, the light-receiving time of the detector 10 may also be taken into account in order to perform more detailed correction. For example, Tsp' determined by the following Formula (10) may be substituted into Tsp in Formula (5):

Tsp'[s]=Tsp [s]+light-receiving time of the detector 10 [s]/2 (10)

Note that the light-receiving time of the detector 10 may be determined from the design value or may also be determined by actual measurement.

Next, a description will be given of a method for determining position data subject to correction upon control based on the assumption that the host system 500 is a controller that executes positioning control using the acquired position data. Here, position data, which is actually used for control, for a request made at the time point of the data_req 3 is the one at the time point of the data_req 4 which is the next clock timing. The encoder 100 needs to output the position data subject to correction upon control P4'_1 which predicts the position data P4_1 at the time point of the data_req 4. The position data subject to correction upon control is determined by the following Formula (11):

Position data subject to correction upon control [m]=position data subject to correction upon measurement [m]+moving speed [m/s]×time difference from a time point of control [s]   (11)

For example, when the position data subject to correction upon control P4'_1 in FIG. 8 is determined, the position data subject to correction upon control P4'_1 is represented as the following Formula (12). Note that a time difference from a time point of control is 100 µs.

$$P4'\_1\ [m]=P3'\_1\ [m]+V2\_10\ [m/s]\times 100\ [\mu s] \quad (12)$$

A description has been given of the case where a processing time from the start of position measurement to the end of computation of position data is longer than 30 µs. In contrast, even when the processing does not end during the Wait time because the processing time is short not longer than 30 µs and the Wait time is further shorter than the processing time, position data can be corrected in the same manner.

Figure 9:
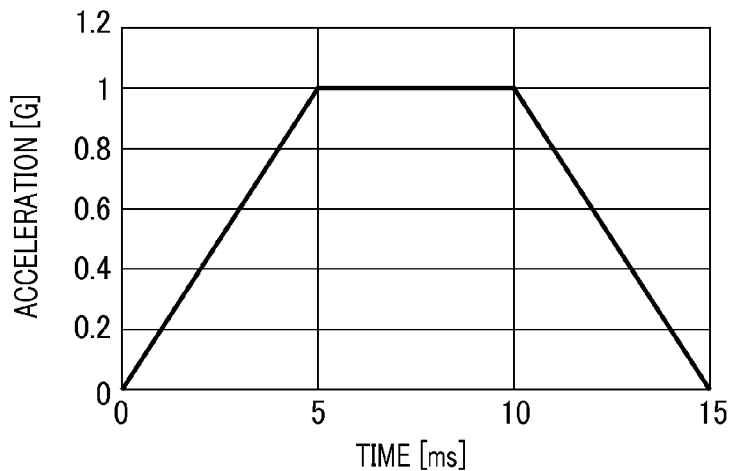
FIG. 9 is a graph illustrating acceleration fluctuation of an object according to the first embodiment.

Next, a description will be given of specific effects obtained by the configuration and processing as described above. Here, consider the case where an object has an acceleration varying as shown in FIG. 9. In FIG. 9, time is plotted on the horizontal axis and gravity acceleration is plotted on the vertical axis. In this case, an object is in a variable acceleration operation in a trapezoidal profile such that acceleration linearly increases (the object accelerates) from 0G to 1G in a time from 0 to 5 ms, acceleration is a constant 1G in a time from 5 to 10 ms, and acceleration linearly decreases (the object decelerates) from 1G to 0G in a time from 10 to 15 ms.

Figure 14:
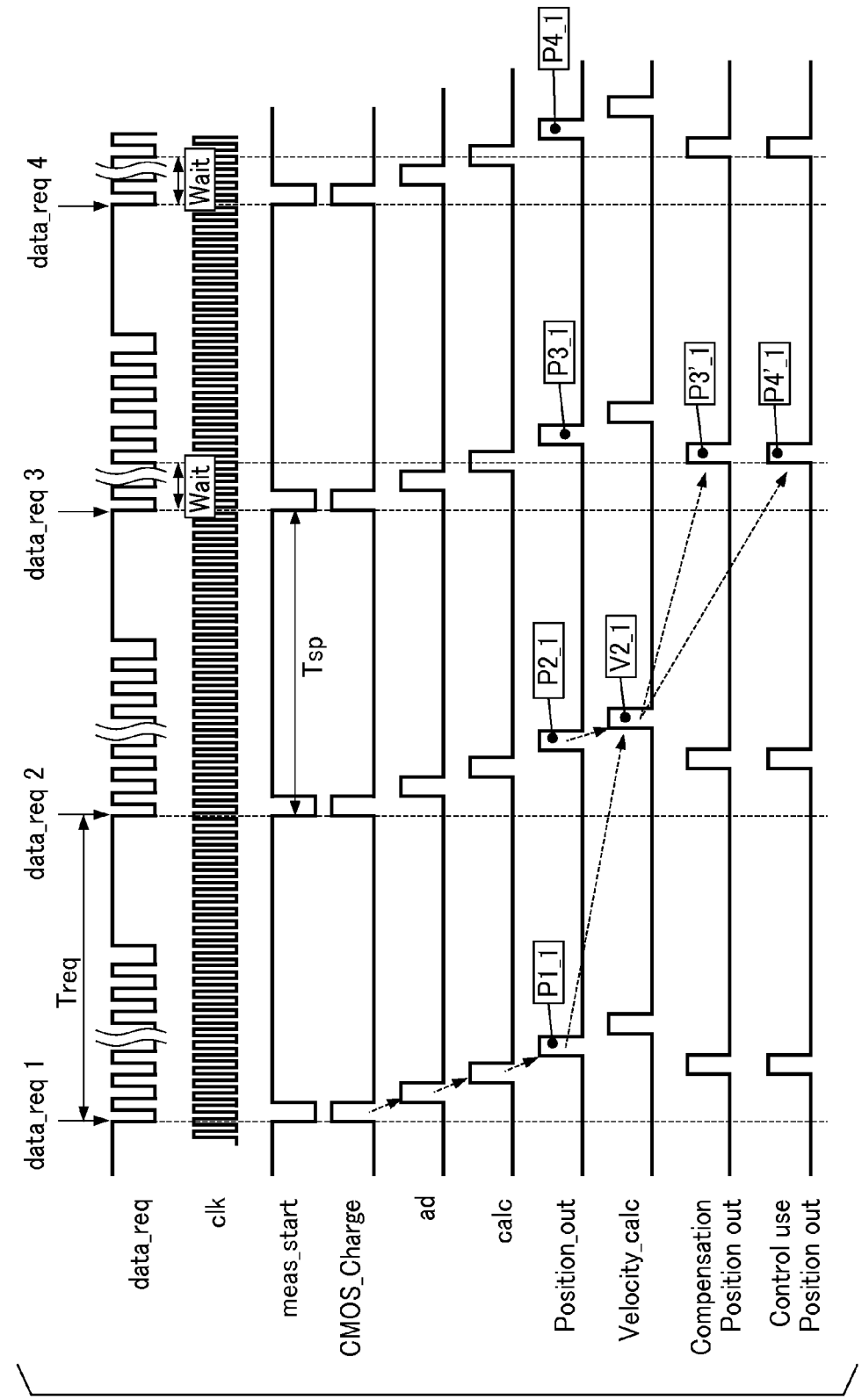
FIG. 14 is a timing chart illustrating the conventional operation timing of the respective units

Firstly, for comparison, a description will be given of the result of correction by the conventional encoder and a positional error which may occur at the time. FIG. 14 is a timing chart illustrating the operation timing of the respective units of the conventional encoder corresponding to FIGS. 7 and 8. In the conventional encoder, there is no meas signal which is a clock signal for use in for position measurement as can be seen from comparison of FIGS. 7 and 8, so that position measurement is performed with respect to each cycle of a data request. FIG. 14 shows the case where the processing time from the start of position measurement to the end of computation of correction position data is longer than the Wait time.

Firstly, consider the case where it may be desired for the host system serving as a data collecting and analyzing unit to obtain position data at the time point of the data_req 3 in FIG. 14. In this case, since the processing up to output of the position data P3_1 at the time point of the data_req 3 does not end during the Wait time, the encoder cannot output the position data P3_1 acquired at the time point of the data_req 3 as it is. Thus, the encoder needs to output the position data subject to correction upon measurement P3'_1 which predicts the position data P3_1 at the time point of the data_req 3. The position data subject to correction upon measurement P3'_1 is determined by the following Formula (13) with reference to the above Formula (5). Note that Tsp is 100 as which is the same as the data request cycle "Treq".

$$P3'\_1\ [m]=P2\_1\ [m]+V2\_1\ [m/s]\times 100\ [\mu s] \quad (13)$$

Figure 10A:
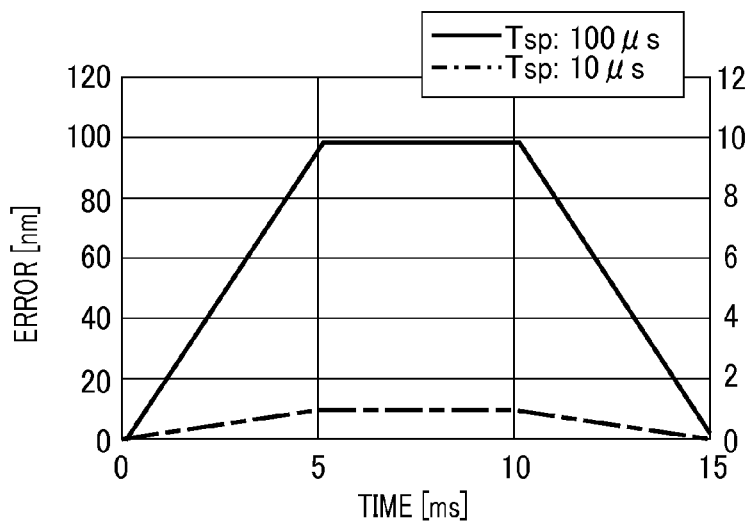
FIG. 10A is a graph illustrating a positional error pertaining to correction upon measurement.
Figure 10B:
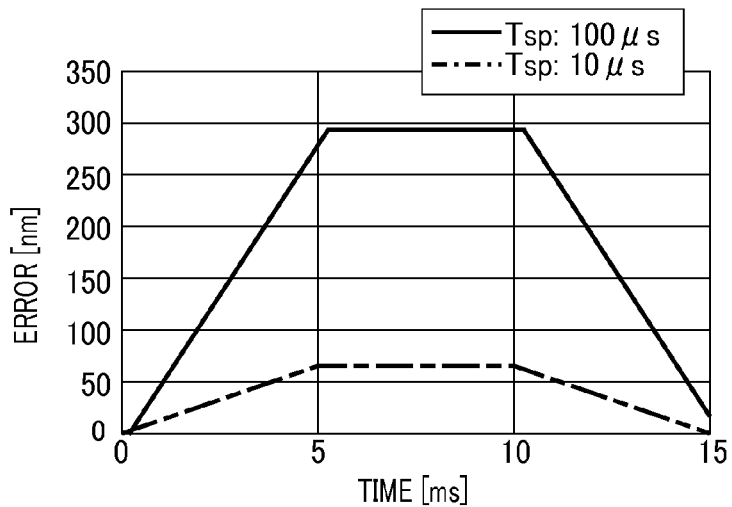
FIG. 10B is a graph illustrating a positional error pertaining to correction upon control.

A difference between the position data P3_1 at the time point of the actual data_req 3 and the position data subject to correction upon measurement P3'_1 obtained herein is a positional error which may conventionally occur. Each of FIGS. 10A and 10B is a graph illustrating a positional error obtained for an object which is in acceleration operation shown in FIG. 9. In particular, FIG. 10A is a graph illustrating a positional error pertaining to correction upon measurement. The conventional error amount shown by the solid line in FIG. 10A is plotted on the vertical axis at the left side with respect to time plotted on the horizontal axis. The error amount is proportional to a magnitude of the acceleration of the object and is 98 nm at maximum.

In contrast, in the encoder 100 according to the present embodiment, Tsp is 10 µs and a positional error for an object which is in operation shown in FIG. 9, which is a difference between the position data subject to correction upon measurement determined by Formula (5) and the actual position, is represented by the chain-dotted line in FIG. 10A. Note that the error amount shown by a chain-dotted line is plotted on the vertical axis at the right side with respect to time plotted on the horizontal axis. The scale of the vertical axis at the right side relative to the vertical axis at the left side plotting the error amount in the conventional case is 1/10. In this case, the error amount is 0.98 nm at maximum and is significantly reduced to about 1/100 as compared with the conventional case. In this manner, according to the present embodiment, it is found that highly-accurate position data subject to correction upon measurement having a positional error of 1 nm or less is obtained.

Next, consider the case where the host system 500 is a controller that executes positioning control using the acquired position data. Firstly, consider the result of correction by the conventional encoder and a positional error which may occur at the time. Here, position data, which is actually used for control, for a request made at the time point of the data_req 3 is, for example, the one at the time point of a data_req 4 which is the next clock timing. In this case, the encoder needs to output the position data subject to correction upon control P4'_1 which predicts position data P4_1 at the time point of the data_req 4. The position data subject to correction upon control P4'_1 is determined by the following Formula (14) with reference to the above Formula (11). Note that a time difference from a time point of control is 100 µs.

$$P4'\_1\ [m]=P3'\_1\ [m]+V2\_1\ [m/s]\times 100\ [\mu s] \quad (14)$$

A difference between the position data P4_1 at the time point of the actual data_req 4 and the position data subject to correction upon measurement P4'_1 obtained herein is a positional error which may conventionally occur. FIG. 10B is a graph illustrating a positional error pertaining to correction upon control. The conventional error amount shown by the solid line in FIG. 10B is proportional to a magnitude of the acceleration of the object and is 294 nm at maximum.

In contrast, in the encoder 100 according to the present embodiment, Tsp is 10 µs and a positional error for an object which is in operation shown in FIG. 9, which is a difference between the position data subject to correction upon measurement determined by Formula (11) and the actual position, is represented by the chain-dotted line in FIG. 10B. In this case, the error amount is 64.6 nm at maximum and is reduced to about ¼.5 as compared with the conventional case. In this manner, according to the present embodiment, it is found that highly-accurate position data subject to correction upon measurement having a positional error of 0.1 μm or less is obtained.

While a description has been given on the assumption that Tsp is 10 μs, Tsp may vary depending on the processing speed of the position operation device 30 or the like. Thus, a description will be given below of how a positional error amount varies depending on a magnitude of Tsp.

Figure 11A:
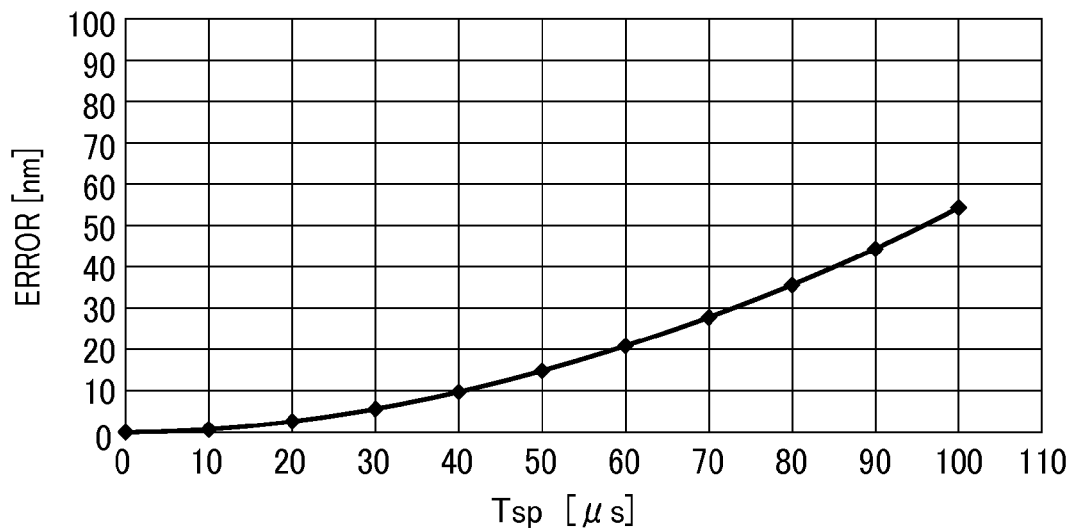
FIG. 11A is a graph illustrating a positional error with respect to Tsp for data subject to correction upon measurement.

FIG. 11A is a graph illustrating a positional error amount [nm] with respect to Tsp [μs] for position data subject to correction upon measurement. For example, when Tsp is 10 μs, the error amount is 0.98 nm as described above which is about ¹⁄₁₀₀ as compared with the conventional case. When Tsp is 0 μs, the encoder 100 can output the acquired position data as it is, so that the error amount is 0 nm.

Figure 11B:
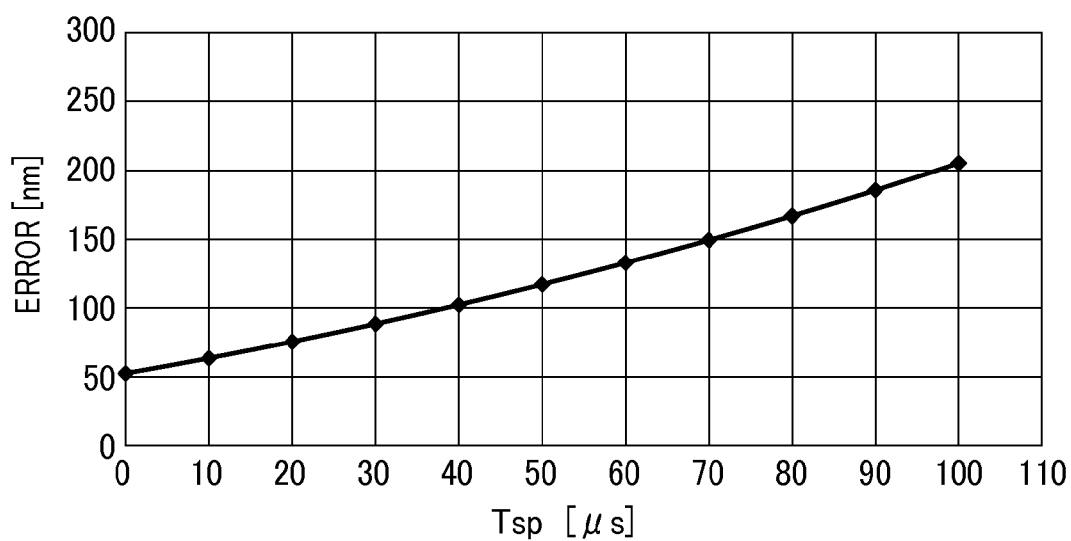
FIG. 11B is a graph illustrating a positional error with respect to Tsp for data subject to correction upon control.

FIG. 11B is a graph illustrating a positional error amount [nm] with respect to Tsp [μs] for position data subject to correction upon control. For example, when Tsp is 10 μs, the error amount is 64.6 nm as described above which is about ¼.5 as compared with the conventional case. When Tsp is 0 μm, an object moves for a time until the host system 500 performs control, so that the error amount is 53.9 nm which is about ⅕.5 as compared with the conventional case.

In this manner, even when an object is in an acceleration motion, the encoder 100 generates and uses a high speed clock for position measurement in synchronization with the cycle of a data request signal so as to perform position or angle measurement in a cycle shorter than the cycle of the data request signal. In other words, it has conventionally been difficult to output an accurate position or angle if the cycle of a data request signal is not shortened, whereas there is no need to shorten the cycle of a data request signal in the encoder 100. Thus, there is also no need to increase a computation load on the host system 500 when the amount of output data increases by shortening the cycle of a data request signal. Consequently, the host system 500 may not be complicated and expensive.

As described above, according to the present embodiment, a measuring apparatus and a measuring method which are advantageous, for example, in terms of displacement measurement accuracy of the object which displaces at high speed may be provided. By using such a measuring apparatus, a processing apparatus which is advantageous in terms of high-accuracy processing such as measurement, inspection, machining of an object may be provided.

Second Embodiment

Figure 12:
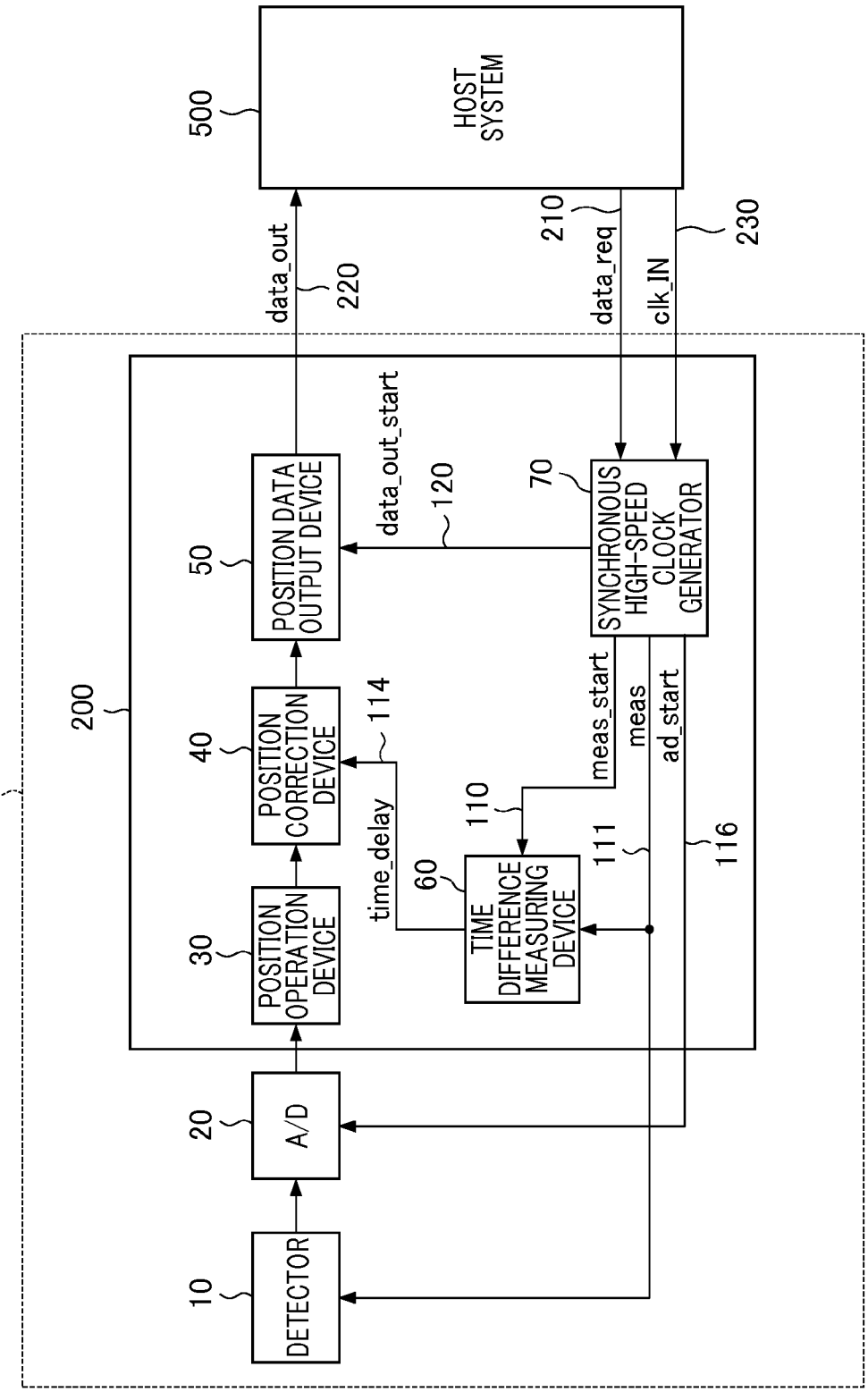
FIG. 12 is a diagram illustrating a configuration of the signal processing system of an encoder according to a second embodiment of the present invention.

Next, a description will be given of a measuring apparatus according to a second embodiment of the present invention. FIG. 12 is a block diagram illustrating a configuration of the signal processing system of an encoder 300 according to the present embodiment. A feature of the encoder 300 according to the present embodiment lies in the fact that, although the encoder 100 according to the first embodiment includes the oscillator 80, the encoder 300 does not include the oscillator but receives an input of a clk_IN signal 230 from the host system 500. The other aspects of the construction of the encoder 300, which are basically the same as those of the encoder 100 according to the first embodiment, are denoted by the same reference numerals in FIG. 12, and description thereof is omitted.

Likewise, the clk_IN signal 230 is a clock signal in synchronization with the data_req signal 210 transmitted from the host system 500. The encoder 300 receives the clk_IN signal 230 from the host system 500, and the synchronous high-speed clock generator 70 generates the meas signal 111 based on the clk_IN signal 230. Furthermore, the synchronous high-speed clock generator 70 also generates a clock signal for use in computation by the position operation device 30 and the position correction device 40. More specifically, the clk_IN signal 230 is firstly input to the PLL 78 provided in the synchronous high-speed clock generator 70. Since the clk_IN signal 230 is a continuous clock signal, the PLL 78 can constantly generate a new clock signal in synchronization with the clk_IN signal 230 in a sample operation. Thus, in the present embodiment, there is no need to provide the sample and hold switch 782 in the PLL 78. For example, when the frequency of the clk_IN signal 230 is 100 kHz and the frequency division ratio (1/N) of the first frequency divider 785 is ¹⁄₂₀₀₀, the voltage control oscillator 784 outputs the clk signal 112 having a frequency of 200 MHz in synchronization with the clk_IN signal 230. Then, the synchronous high-speed clock generator 70 imposes a delay on the clk signal 112 by frequency division so as to generate the meas signal 111, the ad_start signal 116, the meas_start signal 110, and the data_out_start signal 120.

Figure 13:
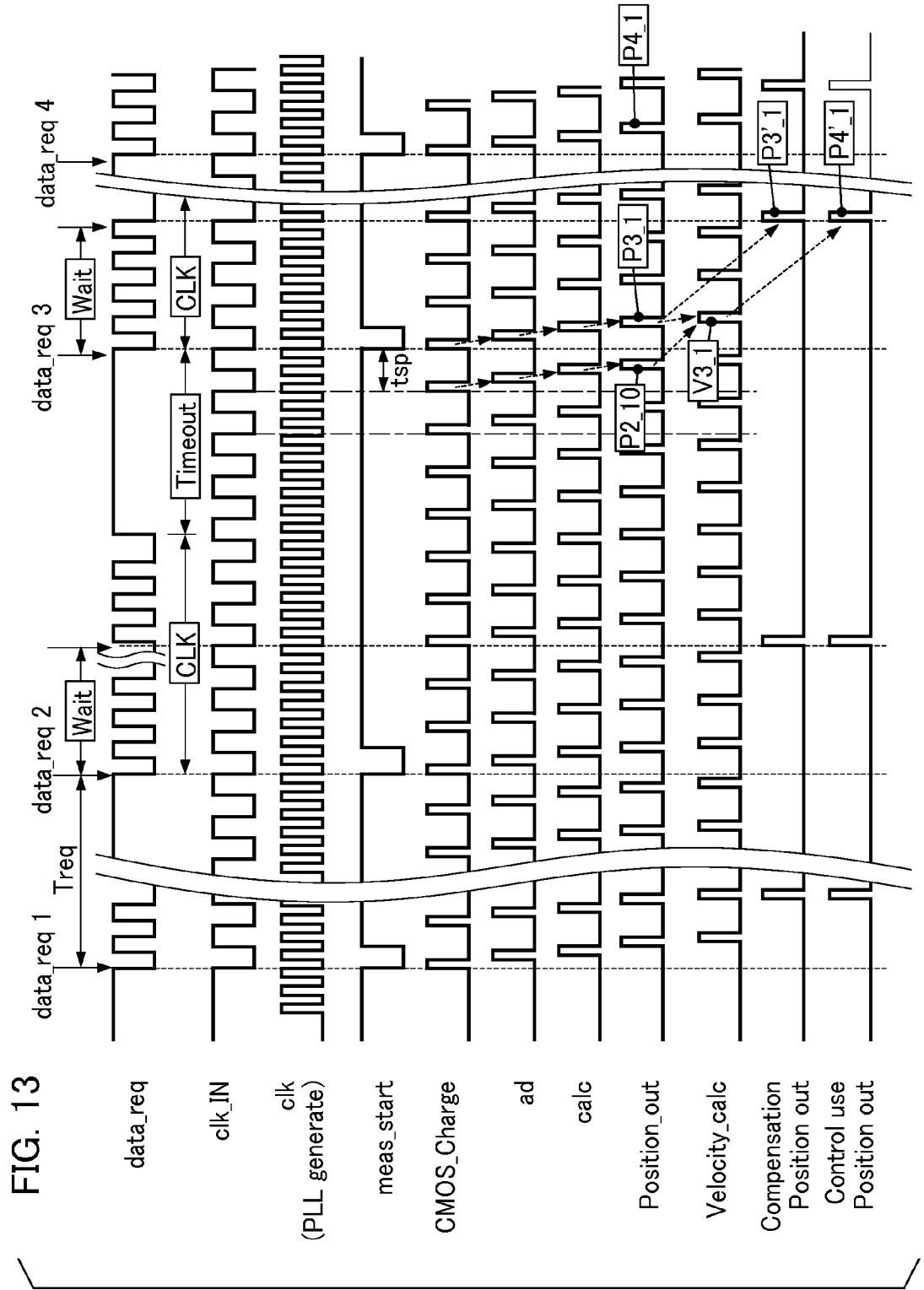
FIG. 13 is a timing chart illustrating the operation timing of the respective units according to the second embodiment.

FIG. 13 is a timing chart illustrating the operation timing of the respective units in the present embodiment, which corresponds to FIG. 7 in the first embodiment. FIG. 13 is different from FIG. 7 in that there are a "clk_IN" signal and a "clk (PLL generate) signal instead of a "clk" signal and a "meas (100 kHz)" signal. The term "clk_IN" refers to the clk_IN signal 230, and the synchronous high-speed clock generator 70 generates a clk (PLL generate) based on clk_IN. For example, clk_IN may have a frequency of 100 kHz and clk (PLL generate) may have a frequency of 200 MHz. The synchronous high-speed clock generator 70 frequency-divides the clk (PLL generate) so that the meas signal 111 can be generated. Note that the meas signal 111 has a frequency of 100 kHz which is the same as that of clk_IN but is not shown in FIG. 13 (clock timing is the same as that of clk_IN). Then, the detector 10 in the encoder 300 performs position measurement with respect to each cycle of the meas signal 111.

FIG. 13 shows the case where a processing time from the start of position measurement to the end of computation of correction position data is shorter than the Wait time. In contrast, when a processing time from the start of position measurement to the end of computation of correction position data is longer than the Wait time, the same is applicable by replacing clk_IN and clk (PLL generate) with meas (100 kHz) and clk, respectively, in FIG. 8 in the first embodiment.

In this manner, the encoder 300 receives a clock signal in synchronization with the cycle of a data request signal from the host system 500, and thus, the oscillator 80 is not required as compared with the first embodiment. Thus, the present embodiment is advantageous in that the configuration and signal processing may be simplified while providing the same effects as those of the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the frequencies of the respective clock signals exemplified in the above embodiments are not limited to these values but may vary within the range of scope thereof. While, in the above embodiments, a description has been given on the assumption that the meas signal 111 is a continuous clock signal, the meas signal 111 may also be an intermittent signal provided that a plurality of position measurement timings is given to the detector 10 during a data request cycle. Furthermore, while the data_req signal 210 which is a data request signal has a periodicity as described above, the data_req signal 210 may not have a periodicity provided that measurement data acceptable in terms of accuracy can be acquired.

This application claims the benefit of Japanese Patent Application No. 2013-123379 filed on Jun. 12, 2013, which is hereby incorporated by reference herein in its entirety.

What is claimed is:

1. A measuring apparatus for performing detection of a signal that varies with displacement of an object and measurement of the displacement, the measuring apparatus comprising:
    a clock generator configured to generate, in synchronization with a request signal for requesting measurement data, a first clock signal having a cycle shorter than a cycle of the request signal;
    a detector configured to perform the detection with respect to each cycle of the first clock signal;
    an operation device configured to obtain the measurement data based on an output of the detector; and
    a correction device configured to:
        obtain a displacement amount of the object per unit time based on a plurality of the measurement data from the operation device; and
        correct the measurement data based on the obtained displacement amount and a time difference between the first clock signal relating to the measurement data and the first clock signal relating to the request signal.

2. The measuring apparatus according to claim 1, wherein the cycle of the request signal includes a first term in which the request signal includes a plurality of clock signals and a second term in which the request signal is a constant value.

3. A measuring apparatus for performing detection of a signal that varies with displacement of an object and measurement of the displacement, the measuring apparatus comprising:
    a clock generator configured to generate, in synchronization with a request signal for requesting measurement data, a first clock signal having a cycle shorter than a cycle of the request signal;
    a detector configured to perform the detection with respect to each cycle of the first clock signal;
    an operation device configured to obtain the measurement data based on an output of the detector; and
    a correction device configured to:
        obtain a displacement amount of the object per unit time based on a plurality of the measurement data from the operation device; and
        correct the measurement data based on the obtained displacement amount and a time difference between the first clock signal relating to the measurement data and the first clock signal relating to the request signal,
    wherein the cycle of the request signal includes a first term in which the request signal includes a plurality of clock signals and a second term in which the request signal is a constant value,
    wherein the clock generator includes a counter and a phase synchronizing device,
    wherein the counter is configured to count a clock signal included in the request signal, and
    wherein the phase synchronizing device is configured to output, based on an output of the counter, the first clock signal in synchronization with the clock signal included in the request signal in the first term and output, continually in the second term after the first term, the first clock signal output in the first term.

4. The measuring apparatus according to claim 1, wherein the clock generator is configured to generate the first clock signal in synchronization with a second clock signal that is synchronized with the request signal and has a cycle shorter than a cycle of the request signal.

5. The measuring apparatus according to claim 1, further comprising a time difference measuring device configured to measure the time difference.

6. The measuring apparatus according to claim 1, wherein the correction device is configured to correct the measurement data to obtain measurement data at a time at which the request signal is received.

7. The measuring apparatus according to claim 1, wherein the correction device is configured to correct the measurement data to obtain measurement data at a time later than a time at which the request signal is received.

8. A processing apparatus for processing an object, the apparatus comprising:
    a measuring apparatus defined in claim 1 for measuring displacement of the object.

9. A measuring method of performing detection of a signal that varies with displacement of an object and performing measurement of the displacement, the measuring method comprising the steps of:
    generating, in synchronization with a request signal for requesting measurement data, a first clock signal having a cycle shorter than a cycle of the request signal;
    performing the detection with respect to each cycle of the first clock signal;
    obtaining the measurement data based on the detection;
    obtaining a displacement amount of the object per unit time based on a plurality of the measurement data; and
    correcting the measurement data based on the obtained displacement amount and a time difference between the first clock signal relating to the measurement data and the first clock signal relating to the request signal.

* * * * *